(12) United States Patent
Horii et al.

(10) Patent No.: US 9,170,123 B2
(45) Date of Patent: Oct. 27, 2015

(54) METHOD AND APPARATUS FOR GENERATING INFORMATION

(75) Inventors: Hiroshi Horii, Burlingame, CA (US); Agathe Battestini, San Francisco, CA (US); Timothy Sohn, Mountain View, CA (US)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 12/982,597

(22) Filed: Dec. 30, 2010

(65) Prior Publication Data

US 2012/0036115 A1 Feb. 9, 2012

Related U.S. Application Data

(63) Continuation-in-part of application No. 12/851,970, filed on Aug. 6, 2010, now abandoned.

(51) Int. Cl.
*G06F 15/16* (2006.01)
*G01C 21/36* (2006.01)

(52) U.S. Cl.
CPC ........ *G01C 21/3679* (2013.01); *G01C 21/3682* (2013.01)

(58) Field of Classification Search
None
See application file for complete search history.

(56) References Cited

U.S. PATENT DOCUMENTS

| 5,991,735 | A | 11/1999 | Gerace | |
|---|---|---|---|---|
| 6,377,278 | B1 * | 4/2002 | Curtright et al. | 345/634 |
| 6,724,382 | B2 * | 4/2004 | Kenyon et al. | 345/419 |
| 7,466,810 | B1 | 12/2008 | Quon et al. | |
| 7,599,983 | B2 | 10/2009 | Harper et al. | |
| 7,725,494 | B2 | 5/2010 | Rogers et al. | |
| 7,739,723 | B2 | 6/2010 | Rogers et al. | |
| RE41,450 | E | 7/2010 | Briggs et al. | |
| 7,792,903 | B2 | 9/2010 | Fischer et al. | |
| 7,792,947 | B1 | 9/2010 | Kembel et al. | |
| 7,792,986 | B2 | 9/2010 | Donoho et al. | |
| 7,856,473 | B2 | 12/2010 | Horikiri et al. | |
| 7,886,000 | B1 | 2/2011 | Polis et al. | |
| 7,933,296 | B2 | 4/2011 | Augustine et al. | |
| 7,937,484 | B2 | 5/2011 | Julia et al. | |
| 8,046,424 | B2 | 10/2011 | Novik et al. | |

(Continued)

FOREIGN PATENT DOCUMENTS

| EP | 1168204 A2 | 2/2002 |
|---|---|---|
| JP | 9-245056 A2 | 9/1997 |

(Continued)

OTHER PUBLICATIONS

Cui, Yanqing, et al., "How People Use the Web on Mobile Devices", WWW 2008, Apr. 21-25, 2008, pp. 905-914.

(Continued)

*Primary Examiner* — Phuoc Nguyen
(74) *Attorney, Agent, or Firm* — Alston & Bird LLP

(57) ABSTRACT

An apparatus, comprising a processor, memory including computer program code, the memory and the computer program code configured to, working with the processor, cause the apparatus to perform at least determining at least one significant location, receiving a first information associated with the significant location from a first information repository, retrieving a second information associated with the significant location from a second information repository, and generating a third information based at least in part on the first information and the second information is disclosed.

19 Claims, 10 Drawing Sheets

(56) References Cited

U.S. PATENT DOCUMENTS

| | | | |
|---|---|---|---|
| 8,073,905 B2 | 12/2011 | Ozzie et al. | |
| 8,078,696 B2 | 12/2011 | LaJoie et al. | |
| 8,082,301 B2 | 12/2011 | Ahlgren et al. | |
| 8,086,662 B1 | 12/2011 | Doyle et al. | |
| 2002/0032781 A1 | 3/2002 | Yoshida et al. | |
| 2003/0018789 A1 | 1/2003 | Ishiguro | |
| 2005/0240875 A1 | 10/2005 | Takayama et al. | |
| 2006/0059152 A1* | 3/2006 | Nakamura | 707/7 |
| 2007/0016651 A1 | 1/2007 | Blagsvedt et al. | |
| 2007/0157072 A1 | 7/2007 | LaBiche | |
| 2008/0212616 A1 | 9/2008 | Augustine et al. | |
| 2009/0160873 A1* | 6/2009 | Kew et al. | 345/629 |
| 2009/0249222 A1 | 10/2009 | Schmidt et al. | |
| 2009/0307333 A1 | 12/2009 | Welingkar et al. | |
| 2010/0184451 A1* | 7/2010 | Wang et al. | 455/456.1 |
| 2010/0185730 A1 | 7/2010 | Sebastian | |
| 2010/0235078 A1* | 9/2010 | Chen et al. | 701/200 |
| 2010/0257442 A1 | 10/2010 | Kembel et al. | |
| 2011/0010650 A1* | 1/2011 | Hess et al. | 715/765 |
| 2011/0264370 A1* | 10/2011 | Jakobson et al. | 701/209 |
| 2011/0264736 A1 | 10/2011 | Zuckerberg et al. | |
| 2011/0264745 A1 | 10/2011 | Ferlitsch | |
| 2011/0270923 A1 | 11/2011 | Jones et al. | |
| 2011/0283322 A1* | 11/2011 | Hamano | 725/44 |
| 2012/0302255 A1* | 11/2012 | Wang et al. | 455/456.1 |

FOREIGN PATENT DOCUMENTS

| | | | |
|---|---|---|---|
| JP | 2002-99568 A | 4/2002 | |
| JP | 2006-65511 A | 3/2006 | |
| JP | 2009-71624 A | 4/2009 | |
| JP | 2009-521765 A | 6/2009 | |
| WO | WO 01/69860 A2 | 9/2001 | |
| WO | 2007075201 A1 | 7/2007 | |
| WO | 2008/070502 A2 | 6/2008 | |
| WO | 2010/002497 A1 | 1/2010 | |

OTHER PUBLICATIONS

Dearman, David, et al., "It's on My Other Computer!: Computing With Multiple Devices", CHI 2008, Apr. 5-10, 2008, pp. 767-776.
Gardner, Michael, "Mobile Web Sessions for Mobile Computing", WWW 2004, May 17-22, 2004, 8 pages.
Kaasten, Shaun, et al., "How People Recognize Previously Seen Web Pages From Titles, URLs and Thumbnails", HCI 2002, pp. 247-265.
Kane, Shaun K., et al., "Exploring Cross-Device Web Use on PCs and Mobile Devices", Interact 2009, pp. 722-735.
Karlson, Amy K., et al., "Working Overtime: Patterns of Smartphone and PC Usage in the Day of an Information Worker", Pervasive 2009, pp. 398-405.
Pierce, Jeffrey S., et al., "An Infrastructure for Extending Applications' User Experiences Across Multiple Personal Devices", UIST 2008, pp. 101-110.
Salton, G., et al., "A Vector Space Model for Automatic Indexing", Communications of the ACM, vol. 18, No. 11, Nov. 1975, pp. 613-620.
Sohn, Timothy, et al., "A Diary Study of Mobile Information Needs", CHI 2008, Apr. 5-10, 2008, pp. 443-442.
Teevan, Jaime, et al., "Visual Snippets: Summarizing Web Pages for Search and Revisitation", CHI 2009, Apr. 4-9, 2009, pp. 2023-2032.
International Search Report and Written Opinion, received in corresponding Patent Cooperation Treaty Application No. PCT/IB2011/053520, dated Jan. 24, 2012, 10 pages.
Extended European Search Report for Application No. 11814196.9; dated Jan. 3, 2014.
*Google Web History* (http://www.google.com/history); retrieved on Jan. 2, 2014 from <http://en.wikipedia.org/wiki/Google_Web_History>.
Office Action for Japanese Application No. 2013-522340; dated Dec. 18, 2013.
Office Action for U.S. Appl. No. 12/851,970; dated May 15, 2012.
International Search Report and Written Opinion from International Application No. PCT/IB2011/054605 mailed Apr. 10, 2012.
Office Action from Russian Patent Application No. 2013108928, dated Oct. 1, 2014.

\* cited by examiner

METHOD AND APPARATUS FOR GENERATING INFORMATION

RELATED APPLICATION

The subject application is a Continuation-in-Part and claims priority benefit to U.S. patent application Ser. No. 12/851,970, filed Aug. 6, 2010.

TECHNICAL FIELD

The present application relates generally to generating information.

BACKGROUND

There has been a surge in the use of electronic devices for receiving documents. In addition, users may possess more than one electronic device capable of receiving documents.

SUMMARY

Various aspects of examples of the invention are set out in the claims.

An apparatus, comprising a processor, memory including computer program code, the memory and the computer program code configured to, working with the processor, cause the apparatus to perform at least the following: receiving information from a first external apparatus indicating that the first external apparatus received a document associated with a uniform resource locator, evaluating the received information and the historic document information, aggregating at least part of the received information to the historic document information based at least in part on the evaluation, and providing at least part of the aggregated historic document information to a second external apparatus is disclosed.

A method comprising receiving information from a first external apparatus indicating that the first external apparatus received a document associated with a uniform resource locator, evaluating the received information and the historic document information, aggregating at least part of the received information to the historic document information based at least in part on the evaluation, and providing at least part of the aggregated historic document information to a second external apparatus is disclosed.

A computer-readable medium encoded with instructions that, when executed by a computer, perform: receiving information from a first external apparatus indicating that the first external apparatus received a document associated with a uniform resource locator, evaluating the received information and the historic document information, aggregating at least part of the received information to the historic document information based at least in part on the evaluation, and providing at least part of the aggregated historic document information to a second external apparatus is disclosed.

An apparatus, comprising a processor, memory including computer program code, the memory and the computer program code configured to, working with the processor, cause the apparatus to perform at least determining at least one significant location, receiving a first information associated with the significant location from a first information repository, retrieving a second information associated with the significant location from a second information repository, and generating a third information based at least in part on the first information and the second information is disclosed.

A method comprising determining at least one significant location, receiving a first information associated with the significant location from a first information repository, retrieving a second information associated with the significant location from a second information repository, and generating, using a processor, a third information based at least in part on the first information and the second information is disclosed.

A computer-readable medium encoded with instructions that, when executed by a computer, perform determining at least one significant location, receiving a first information associated with the significant location from a first information repository, retrieving a second information associated with the significant location from a second information repository, and generating a third information based at least in part on the first information and the second information is disclosed.

An apparatus comprising means for determining at least one significant location, means for receiving a first information associated with the significant location from a first information repository, means for retrieving a second information associated with the significant location from a second information repository, and means for generating a third information based at least in part on the first information and the second information is disclosed.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

An embodiment of the invention and its potential advantages are understood by referring to FIGS. 1A through 8 of the drawings.

Computing devices are becoming more prevalent throughout people's lives. Mobile phones, netbooks, laptops, and media servers are increasing in popularity. As the number of heterogeneous devices increases, sharing a user's information across these devices may become difficult for a user. For example, a user may desire to start a task on a mobile phone and finish the task on another device, such as a laptop, desktop, and/or the like.

Figure 1A:
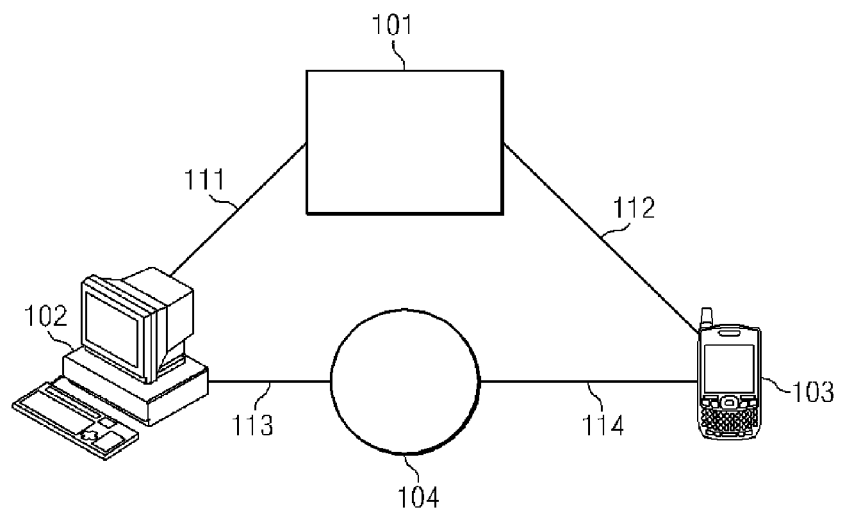
FIGS. 1A-1B are diagrams illustrating apparatus communication according to at least one example embodiment.
Figure 1B:
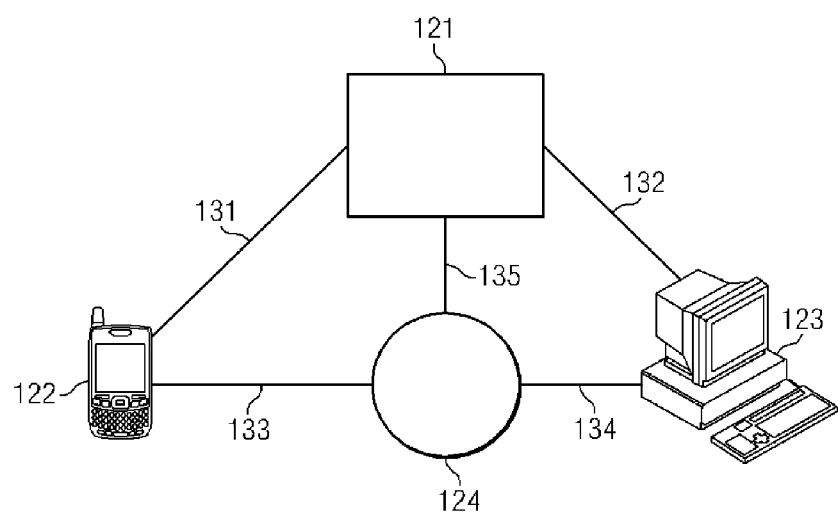

For example, a user may pass time while waiting in line to checkout at the grocery store by browsing on a mobile device, such as device 122 of FIG. 1B, through Twitter feeds. One of the feeds may have comprised a link to a news story. The user may select the link, but be preempted in viewing the news story by her turn to check out. When the user gets home, the user may desire to use a laptop, such as device 123 of FIG. 1B, instead of the mobile device. It may be desirable for the user to have a link to the news story that she selected while using her mobile device in the checkout line.

In another example, a user may receive an invitation to a party. The user may look up directions on his personal computer, such as device 102 of FIG. 1A, to determine the location of the party before confirming his attendance. On the day of the party, the user may be away from his personal computer and fail to remember directions to the party. In such an example, it may be desirable for the user to be able to view, on his mobile device, such as device 103 of FIG. 1A, recent map and direction searches he has made on all his personal devices.

FIGS. 1A-1B are diagrams illustrating apparatus communication according to at least one example embodiment. The examples of FIGS. 1A-1B are merely examples of apparatus communication, and do not limit the scope of the claims. For example, apparatuses may vary by type, number, configuration, and/or the like. In another example, one or more communication paths may vary.

FIG. 1A is a diagram illustrating apparatus communication according to at least one example embodiment. In the example of FIG. 1A, apparatus 101 relates to an apparatus for aggregating document information. Apparatus 101 may be in communication with device 102 using communication path 111. Apparatus 101 may be in communication with device 103 using communication path 112. Device 102 may be in communication with document source 104 using communication path 113. Device 103 may be in communication with document source 104 using communication path 144. In the example of FIG. 1A, the described behavior of devices 102 and 103 may be reversed in at least some circumstances. In an example embodiment, device 102 and device 103 are external to apparatus 101. For example, device 102 may be mechanically separate, electronically separate, systematically separate, and/or the like, from apparatus 101.

Figure 4:
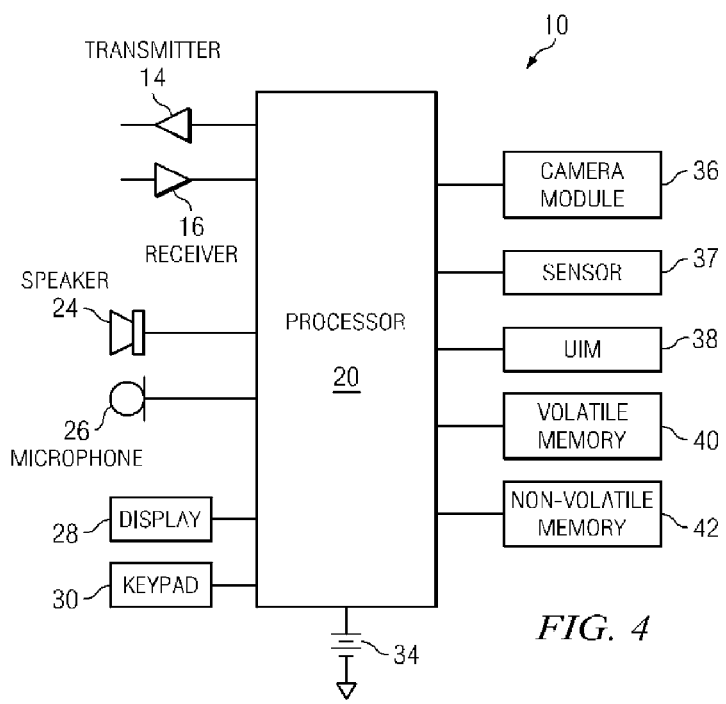
FIG. 4 is a block diagram showing an apparatus according to an example embodiment.

Information may be received using a communication path by way of a receiver, such as receiver 16 of FIG. 4. Information may be provided using a communication path by way of a transmitter, such as transmitter 14 of FIG. 4.

In an example embodiment, device 102 receives a document from document source 104. Document source 104 may relate to one or more devices that provide the document to device 102. For example, document source 104 may relate to a file server, a web server, a database, a computer, and/or the like. The document may relate to a webpage, a file, a video, a downloadable document, and/or the like. The document may be associated with a uniform resource locator. The device may receive the document in response to a request for the document, in association with a broadcast, and/or the like. Apparatus 101 may receive information from device 102 indication that device 102 received the document.

In an example embodiment, apparatus 101 accesses historic document information. Historic document information may relate to browser history, bookmark information, webpage history, and/or the like. Historic document information may comprise information relating to a source of the document, information relating to content of a document, information relating to a device which has received the document, chronological information associated with receiving the document, category information related to the document, and/or the like. Information relating to the source of the document may comprise a uniform resource locator, an address, a domain identification, and/or the like. For example, information relating to a webpage may comprise a uniform resource locator associated with the document, such as "www.ovi.com/services", a uniform resource locator associated with the domain, such as "Ovi.com", a text label associated with the domain, such as "Ovi by Nokia", and/or the like. Information relating to content of a document may relate to image information, such as an image comprised in the document, an image representing the document, a thumbnail image indicating the document, and/or the like, text information, such as information indicating subject matter of the document, for example weather, business hours, phone number, locations. Information relating to a device which has received the document may relate to device identification information, such as an image, a unique identifier, a name, a description, and/or the like. Chronological information associated with receiving the document may relate to information indicating when the document was received, when the document was first received, when the document was last received, how many times the document has been received, how many times the document has been viewed, and/or the like. Category information related to the document may relate to a type of content, such as a map, a video, social networking content, and/or the like. In addition, category information may relate to other historic document information, such as chronological information, information relating to a device, and/or the like. For example, category information may relate to the most recent social networking documents.

Apparatus 101 may aggregate received information from device 102 to the historic document information and provide the aggregated historic document information to device 103. Device 103 may utilize the aggregated historic document information to receive a document associated with the aggregate historic document information. For example, apparatus 101 may receive information indicating that device 102 received a document. In such an example, apparatus 101 may aggregate the information to historic document information, which apparatus 101 may provide to device 103. Device 103 may receive the document using the aggregated historic document information.

In an example embodiment, apparatus 101 evaluates received information indicating that a document was received by a device and base the aggregation of the received information to the historic document information, at least in part, on the evaluation. Aggregation may relate to adding at least part of the received information to the historic document information, merging at least part of the received information with at least part of the historic document information, and/or the like.

In an example embodiment, evaluation comprises comparing at least part of the received information with, at least part of, the historic document information. For example, evaluation may comprise comparing received domain information to domain information associated with a part of the historic document information. Evaluation may relate to category information associated with document information. For example, evaluation may comprise comparing category information associated with the received information to category information associated with at least part of the historic document information. Evaluation may relate to chronological information. For example, evaluation may relate to comparing at least part of the received information relates to a document already represented in the historic document information.

Evaluation may comprise determining that at least part of the received information is related to at least part of the historic document information. For example, evaluation may comprise determining that at least part of the received information and part of the historic document information relate to a common source, a common domain, a common category, similar subject matter, a common document, and/or the like. For example, the apparatus may determine that at least part of the received information and at least part of the historic document information relate to a common social networking account. In another example, evaluation may comprise determining that at least part of the received information and a part of the historic document information have similar category information, such as maps to destinations close to each other.

Evaluation may comprise evaluating the content of the document to determine a category to associate with the received information. For example, the apparatus may evaluate an image to determine that the image is a map, a face, a building, and/or the like. The apparatus may use the determined category to associate the received information with a category associated with at least part of the historic document information. In such an example, evaluation may further comprise further evaluation based, at least in part on the determined category.

Evaluation may comprise determining which part of the received information to aggregate to the historic document information. For example, evaluation may comprise determining significance associated with received information and/or historic document information. In such an example, the apparatus may determine a higher significance based on chronological information, such as how many times a page was viewed, how long the page was viewed, and/or the like, category information, such as whether the page was associated with a domain common to at least part of the historic document information, and/or the like. For example, the apparatus may determine a higher significance to the last document of a domain that was received than to previous documents of the domain that were received. In another example, the apparatus may determine a higher significance for a document containing links to previously received documents than to documents without such links.

In an example embodiment, an apparatus aggregates at least part of the received information to the historic document information based at least in part on determination that at least part of the received information is related to at least part of the historic document information. For example, the apparatus may add received chronological information to a part of the historic document information that relates to a common uniform resource locator. In another example, the apparatus may merge received uniform resource locator information with a part of the historic document information associated with a common category.

In an example embodiment, apparatus 101 may base operations, at least in part, on identification of an account associated with a device. For example, apparatus 101 may maintain different historic document information associated with different accounts, common historic document information associated with all accounts, historic document information common to a subset of accounts, and/or the like. For example, apparatus 101 may utilize multiple historic document information. In such an example, apparatus may restrict operations associated with a particular historic document information to operations associated with an account that is associated with the particular historic document information. Apparatus 101 may identify an account associated with a device based on login, authentication, shared information, code, and/or the like.

In an example embodiment, information associated with the apparatus and/or devices is encrypted. For example, information received by apparatus 101 may be encrypted information. In another example, information provided by apparatus 101 may be encrypted information. In yet another example, information stored by apparatus 101 may be encrypted information. Encryption may be based on a key, a code, an algorithm, and/or the like. This basis may be shared between apparatus 101 and one or more devices. This basis may be common to one or more devices and/or may differ between one or more devices. For example, the basis for encryption may be common between apparatus 101 and all devices. In another example, the basis for encryption may differ between apparatus 101 and each device. In still another example, the basis for encryption for apparatus 101 and a first set of devices may differ from apparatus 101 and another set of devices. Furthermore, any encryption associated with any information stored by apparatus 101 may differ from any encryption between apparatus 101 and one or more devices. Encryption may be based, at least in part, on an account. For example, encryption may vary across different accounts.

FIG. 1B is a diagram illustrating apparatus communication according to at least one example embodiment. Apparatus 121 is similar to apparatus 101 of FIG. 1A. Devices 122 and 123 are similar to devices 102 and 103 of FIG. 1A, respectively. Document source 124 is similar to document source 104 of FIG. 1A. Communication paths 131, 132, 133, and 134 are similar to communication paths 101, 102, 103, and 104, respectively.

In an example embodiment, it may be desirable for apparatus 121 to aggregate information to historic document information beyond the information received from device 122. For example, the received information may fail to include information that might assist the user in understanding the aggregated historic document information, such as an image, content, and/or the like. In such circumstances, it may be desirable for apparatus 121 to communicate with document source 124.

In an example embodiment, apparatus 124 may retrieve supplemental information associated with information received from device 122 indicating that device 122 received a document. Apparatus 121 may utilize communication path 135 to communicate to document source 124. The communication may be similar as described with reference to FIG. 1A.

In an example embodiment, apparatus 121 retrieves supplemental information associated with information received from device 122 indicating that a document was received by device 122. Retrieving the supplemental information may comprise receiving the document. For example, apparatus 121 may utilize the received information from device 122 to receive the document, similar to the document receiving of device 122. Apparatus 121 may evaluate the received document to determine information to aggregate to the historic document information. For example, apparatus may generate a thumbnail image of the document, copy an image form the document, examine the content of the document for categorization, and/or the like. When evaluating the received information, apparatus 121 may similarly evaluate the supplemental information. When performing aggregation, apparatus 121 may similarly aggregate the supplemental information to the historic document information.

Without limiting the scope of the invention in any way, one possible technical advantage associated with apparatus 121 retrieving supplemental information may be reducing the amount of information sent by device 122 to indicate that a document was received. Communication path 131 may be more expensive, less reliable, slower, and/or the like, than communication path 135.

Figure 2:
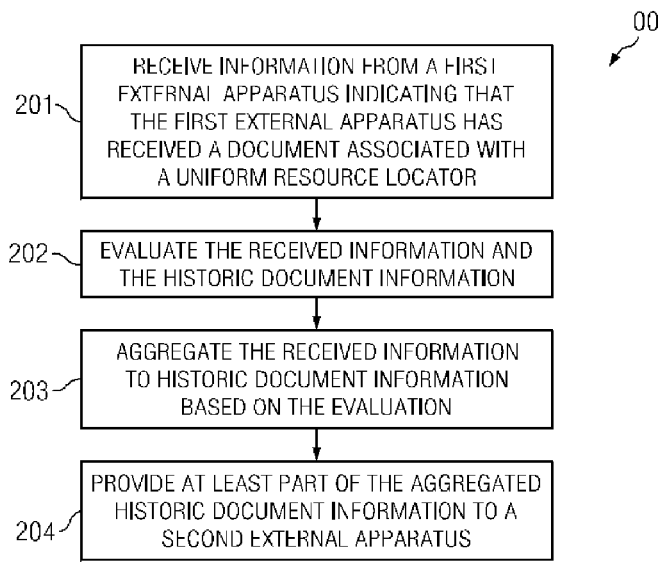
FIG. 2 is a flow diagram showing a set of operations for aggregating document information according to an example embodiment.

FIG. 2 is a flow diagram showing a set of operations 200 for aggregating document information according to an example embodiment. An apparatus, for example electronic device 10 of FIG. 4 or a portion thereof, may utilize the set of operations 200. The apparatus may comprise means, including, for example processor 20 of FIG. 4, for performing the operations of FIG. 2. In an example embodiment, an apparatus, for example device 10 of FIG. 4, is transformed by having memory, for example memory 42 of FIG. 4, comprising computer code configured to, working with a processor, for example processor 20 of FIG. 4, cause the apparatus to perform set of operations 200.

At block 201, the apparatus receives information from a first external apparatus indicating that the first external apparatus has received a document associated with a uniform resource locator, similar as described with reference to FIGS. 1A-1B.

At block 202, the apparatus evaluates the received information and the historic document information, similar as described with reference to FIGS. 1A-1B.

At block 203, the apparatus aggregates at least part of the received information to the historic document information based at least in part on the evaluation, similar as described with reference to FIGS. 1A-1B. In an example embodiment, the apparatus aggregates at least part of the received information to the historic document information in response to the evaluation.

At block 204, the apparatus provides at least part of the aggregated historic document information to a second external apparatus, similar as described with reference to FIGS. 1A-1B.

Figure 3:
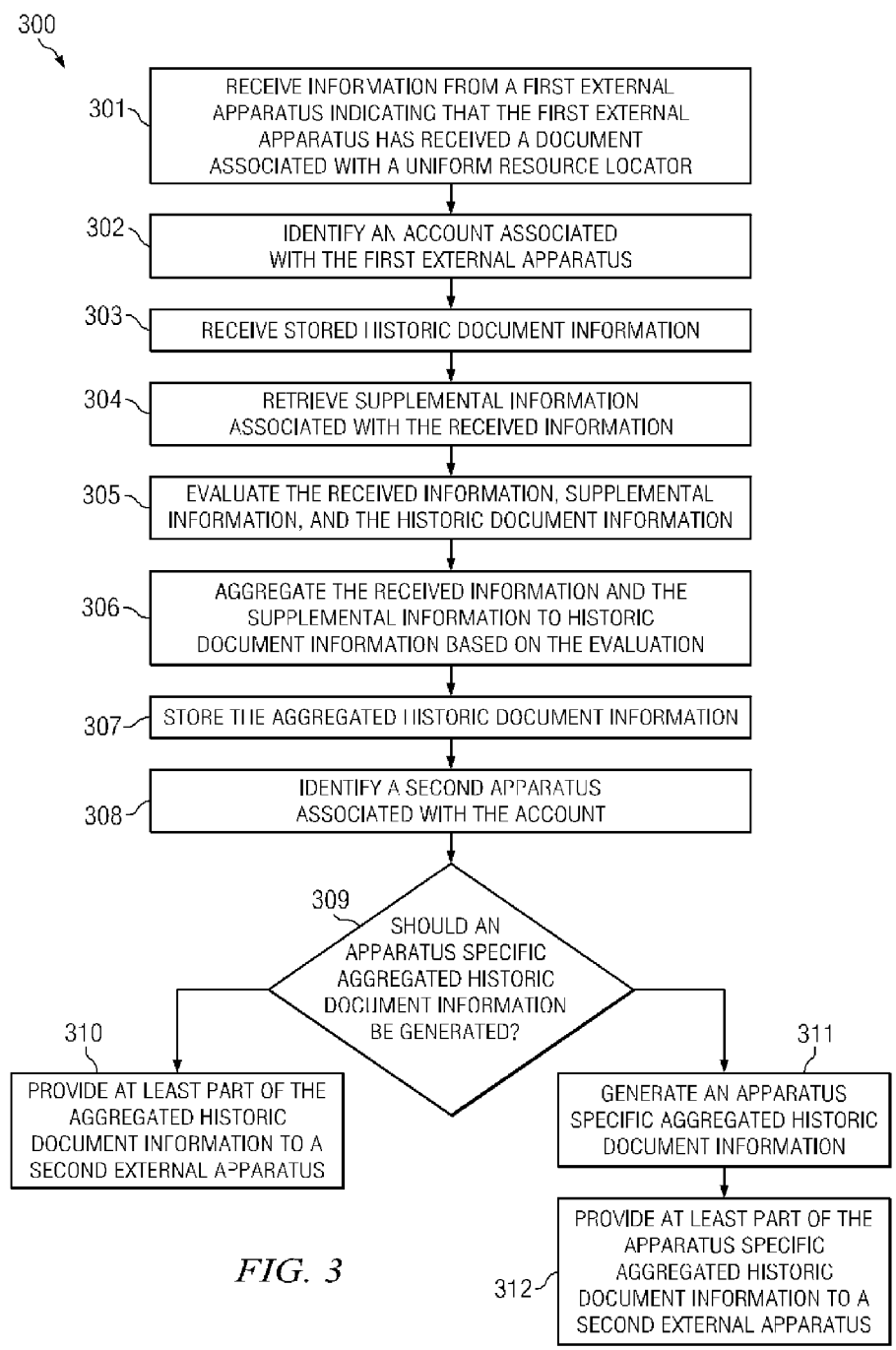
FIG. 3 is a flow diagram showing a set of operations for aggregating document information according to an example embodiment.

FIG. 3 is a flow diagram showing a set of operations 300 for aggregating document information according to an example embodiment. An apparatus, for example electronic device 10 of FIG. 4 or a portion thereof, may utilize the set of operations 300. The apparatus may comprise means, including, for example processor 20 of FIG. 4, for performing the operations of FIG. 3. In an example embodiment, an apparatus, for example device 10 of FIG. 4, is transformed by having memory, for example memory 42 of FIG. 4, comprising computer code configured to, working with a processor, for example processor 20 of FIG. 4, cause the apparatus to perform set of operations 300.

At block 301, the apparatus receives information from a first external apparatus indicating that the first external apparatus has received a document associated with a uniform resource locator, similar as described with reference to block 201 of FIG. 2.

At block 302, the apparatus identifies an account associated with the first external apparatus, similar as described with reference to FIGS. 1A-1B.

At block 303, the apparatus retrieves stored historic document information. The apparatus may retrieve the stored historic document information from nonvolatile memory, such as nonvolatile memory 42 of FIG. 4. In an example embodiment, the stored historic document information may have been stored externally to the apparatus, for example on a separate server, memory, and/or the like. In such circumstances, the apparatus may retrieve the stored historic document information from external storage.

At block 304, the apparatus retrieves supplemental information associated with the received information and aggregate at least part of the supplemental information to the historic document information, similar as described with reference to FIG. 1B.

At block 305, the apparatus evaluates the received information, the supplemental information, and the historic document information, similar as described with reference to block 202 of FIG. 2 and FIG. 1B.

At block 306, the apparatus aggregates at least part of the received information and at least part of the supplemental information to historic document information based at least in part on the evaluation, similar as described with reference to block 203 of FIG. 2 and FIG. 1B.

At block 307, the apparatus stores the aggregated historic document information. The apparatus may store the historic document information from nonvolatile memory, such as nonvolatile memory 42 of FIG. 4. In an example embodiment, the apparatus may store the historic document information externally to the apparatus, for example on a separate server, memory, and/or the like.

At block 308, the apparatus identifies a second apparatus associated with the account, similar as described with reference to FIGS. 1A-1B. The apparatus may identify the second apparatus to be associated with the account in response to communication with the second external apparatus. For example, the apparatus may determine that the account is associated with the second external apparatus, similar as described with reference to FIGS. 1A-1B.

At block 309, the apparatus determines whether to generate an apparatus specific historic document information. The determination may be based, at least in part, on capability of the second external apparatus. For example, the second external apparatus may have a small display, such as display 28 of FIG. 4. In another example, the second external apparatus may have limited input capabilities, such as no keypad, such as keypad 30 of FIG. 4, no mouse, no touch display, and/or the like. In another example, the second external apparatus might be associated with limited user attention, such as an automobile device, tablet, television, refrigerator display, and/or the like. The determination may be based, at least in part on a setting associated with the second external apparatus. For example the apparatus may have a setting associated with the second external apparatus that indicates whether to generate an apparatus specific historic document information. The determination may be based on communication with the second external apparatus. For example, the second external apparatus may send information indicating whether the apparatus should generate an apparatus specific historic document information. If the apparatus determines not to generate an apparatus specific historic document information, flow proceeds to block 310. Otherwise, flow proceeds to block 311.

If, at block 309, the apparatus determines not to generate an apparatus specific historic document information, at block 310, the apparatus provides at least part of the aggregated historic document information to the second external apparatus, similar as described with reference to block 204 of FIG. 2. The apparatus may provide at least part of the aggregated historic document information in response to determining that the second apparatus is associated with the account. The apparatus exits the flow.

If, at block 309, the apparatus determines to generate an apparatus specific historic document information, at block 311, the apparatus generates the apparatus specific historic document information. The apparatus may base generation, at least in part, on capability of the second external apparatus. The capability may be similar as described with reference to block 309. For example, if the second external apparatus has a small display, such as display 28 of FIG. 4, the apparatus may reduce size of images, reduce number of images, reduce amount of text, reduce size of text, and/or the like. In another example, if the second external apparatus has limited input capabilities, such as no keypad, such as keypad 30 of FIG. 4, no mouse, no touch display, and/or the like the apparatus may provide information for speech input, information for tactile input, and/or the like. In another example, if the second external apparatus is associated with limited user attention, such as an automobile device, a tablet, a television, a refrigerator display, and/or the like, the apparatus may replace text with speech, reduce number of images, increase size of images, and/or the like. The generation may be based, at least in part on a setting associated with the second external apparatus. For example the apparatus may have a setting associated with the second external apparatus that indicates a generation parameter for apparatus specific historic document information. The generation may be based on communication with the second external apparatus. For example, the second external apparatus may send information indicating a generation parameter for the apparatus specific historic document information.

At block 312, the apparatus provides at least part of the apparatus specific aggregated historic document information to a second external apparatus, similar as described with reference to block 204 of FIG. 2. The apparatus may provide at least part of the apparatus specific aggregated historic document information in response to determining that the second apparatus is associated with the account.

FIG. 4 is a block diagram showing an apparatus, such as an electronic device 10, according to an example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1A-8. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1A-8. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1A-8. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1A-8. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Although FIG. 4 illustrates an example of an electronic device that may utilize embodiments of the invention including those described and depicted, for example, in FIGS. 1A-8, electronic device 10 of FIG. 4 is merely an example of a device that may utilize embodiments of the invention.

Figure 5B:
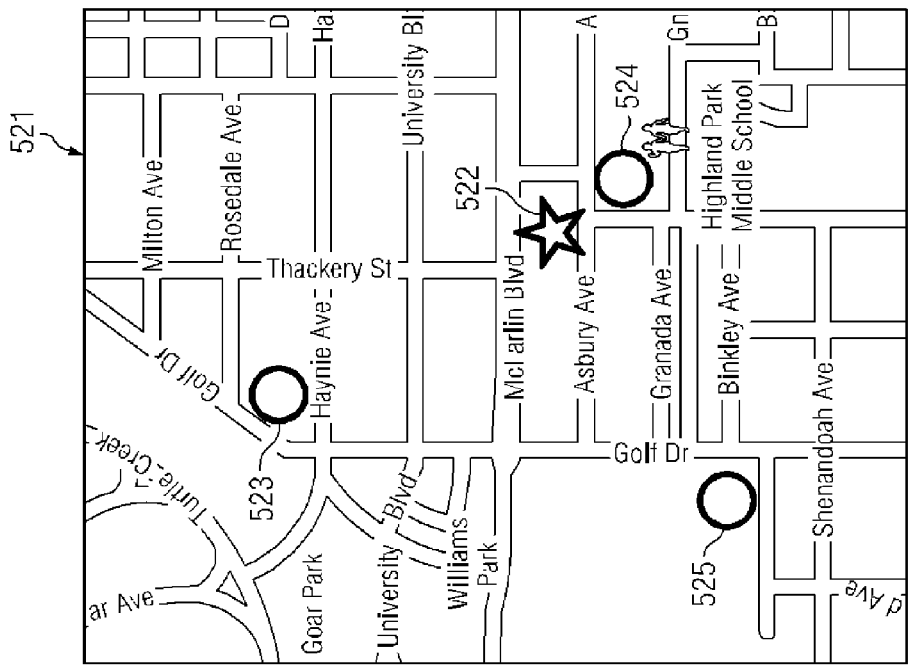
FIGS. 5A-5C are diagrams illustrating representations of significant locations according to at least one example embodiment.
Figure 5A:
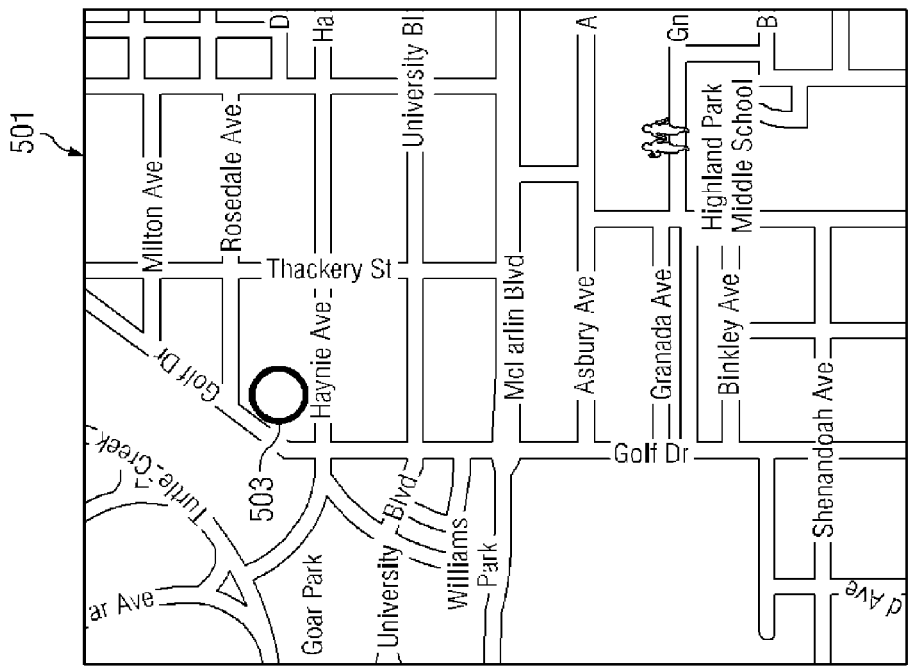
Figure 5C:
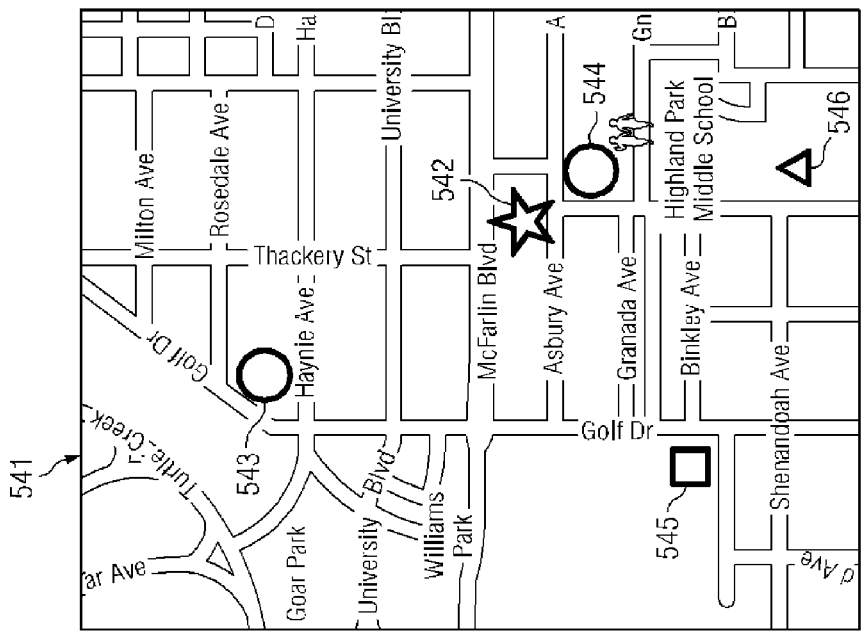

FIGS. 5A-5C are diagrams illustrating representations of significant locations according to at least one example embodiment. The examples of FIGS. 5A-5C are merely examples of significant locations, and do not limit the scope of the claims. For example, significant locations may vary by type, number, position, representation, and/or the like. For example, representation may vary by shape, color, size, lighting, and/or the like.

In an example embodiment, a significant location relates to a location that a user may have interest in. A significant location may be a landmark, a restaurant, a store, a building, a house, location of a friend, and/or the like. A significant location may relate to a geographic position, such as latitude and longitude coordinates. Information associated with a significant location may be retrieved from a repository, such as a geographical information repository. A geographical information repository may relate to a point of interest collection, and/or the like.

A user may be interested in the user's geographical position in relation to one or more significant locations. In an example embodiment, an apparatus may provide information relating geographic position of the apparatus to one or more significant locations. For example, the apparatus may provide map information, such as street names, street positions, and/or the like. In such an example, the map information may indicate geographical position of the apparatus and geographical position of one or more significant locations.

In an example embodiment, an apparatus determines at least one significant location in relation to a geographical position. For example, the apparatus may determine the significant location based at least in part on proximity of the significant location to the geographical position. In such an example, the apparatus may determine significant locations proximate to a geographical position that a user has designated. The geographical position may be geographical position of the apparatus. For example, the apparatus may determine its geographical position, and determine at least one significant location based on the apparatus geographical position.

In an example embodiment, a user may desire information associated with a significant location. For example, a user may be near a significant location and desire information such the significant location's name, the significant location's geographical position, images relating to the significant location, and/or the like. A user may perform a search for a significant location. Such a search may provide a plurality of significant locations that may be of interest to the user. Under such circumstances, a user may benefit from having additional information about the significant location. For example, a user searching for a restaurant may desire contact information for the restaurant, hours of operation for the restaurant, menu information, and/or the like.

In an example embodiment, a user may already have some familiarity with the significant location. For example, the user may have read an article about the significant location, may have received an image of the significant location, may have received a message regarding the significant location, and/or the like. The user may benefit from being able to associate the prior familiarity with the significant location. For example, a user may be able to more easily recognize information associated with a significant location if the information comprises information associated with the user's familiarity with the significant location. In such an example, the user may be aided in recognizing a significant location by recognizing information associated with the significant location of which the user is familiar, such as an image. For instance, a user may be able to distinguish a restaurant the user is searching for from a plurality restaurants based on a review of the restaurant that the user read on a webpage.

In an example embodiment, a user may have received information associated with a significant location, beyond information provided by a search. For example, a user may have received images of a building that are absent from any information received in response to a search for the building. In such an example, the user may benefit from having information that comprises the information received in response to the search, and the images of the building.

FIG. 5A is a diagram illustrating a representation of a significant location according to at least one example embodiment. The example of FIG. 5A illustrates a graphical representation of information associated with significant location 503 in relation to map information 501.

FIG. 5B is a diagram illustrating a representation of significant locations according to at least one example embodiment. The example of FIG. 5B illustrates a graphical representation of information associated with significant location 523, information associated with significant location 524, and information associated with significant location 525, in relation to representation of geographic position 522, and map information 521. In an example embodiment, representation of geographic position 522 may relate to apparatus geographic location.

FIG. 5C is a diagram illustrating a representation of significant locations according to at least one example embodiment. The example of FIG. 5C illustrates a graphical representation of information associated with significant location 543, information associated with significant location 544, information associated with significant location 545, and information associated with significant location 546, in relation to representation of geographic position 542, and map information 541. In an example embodiment, representation of geographic position 542 may relate to apparatus geographic location. In the example of FIG. 5C, representations of information associated with significant location 543 and information associated with significant location 544 differs from representation of information associated with significant location 545, which further differs from representation of information associated with significant location 546. Difference in representation of information associated with a significant location may indicate a difference in the information associated with the significant location. For example, an apparatus may represent information that indicates that a user has familiarity with a significant location differently than information that fails to indicate that a user has familiarity with a significant location. In another example, an apparatus may represent information that indicates that a significant location is a business within its hours of operation differently than information that indicates that a significant location is a business outside its hours of operation and differently than information that fails to indicate a business with hours of operation. In such an example, representations of information associated with significant location 543 and information associated with significant location 544 may indicate businesses within hours of operation, while representation of information associated with significant location 545 may indicate a business outside hours of operation, while representation of information associated with significant location 546 may indicate lack of information regarding hours of operation.

FIGS. 6A-6D are diagrams illustrating graphical representations of information according to at least one example embodiment. The examples of FIGS. 6A-6D are merely examples of graphical representations of information, and do not limit the scope of the claims. For example, graphical representations may vary by arrangement, content, orientation, and/or the like.

In an example embodiment, an apparatus receives first information associated with a significant location from a first information repository. The first information repository may be a geographical information repository. The apparatus may receive the first information in response to a request for the first information, for example from a search. The apparatus may receive the first information in response to sending an indication of a geographic position. For example, the apparatus may receive the first information in response to a different apparatus receiving geographical position of the apparatus. In such an example, the different apparatus may push the first information to the apparatus, for example, by way of an advertisement.

In an example embodiment, the apparatus may retrieve second information associated with the significant location from a second information repository. The second information may differ at least in part from the first information. For example, the first information may comprise a name and geographical position associated with the significant location absent information associated with hours of operation, images, and/or the like. In such an example, the second information may comprise a name, hours of operation, and images associated with the significant location. The apparatus may generate a third information based on the first information and the second information. For example, where the first information comprises name and geographical position, and the second information comprises name, indication that the significant location is a movie theater, a list of movies showing, and show times, the third information may comprise the name, geographical position, indication that the significant location is a movie theater, and a list of movies showing. The apparatus may generate a graphical representation of the third information, such as graphical representation 600 of FIG. 6A, graphical representation 620 of FIG. 6B, graphical representation 640 of FIG. 6C, graphical representation 660 of FIG. 6D, and/or the like.

The second information may relate to historic information associated with the apparatus, an account associated with the apparatus, and/or the like. The second information may relate to cached information on the apparatus. The second information may relate to information received by the apparatus, received by an associated apparatus, and/or the like. The associated apparatus may be associated based on an account, similar as described with reference to FIGS. 1A-1B. For example, the apparatus may be device 103 of FIG. 1A, and the associated apparatus may be device 102 of FIG. 1A.

The second information repository may be different from the first information repository. For example, the first information repository may be a geographical information repository. In such an example, the second information repository may relate to stored historic document information, for example, from a device performing operations 200 of FIG. 2. In another example, the second information repository may relate to information stored on a memory, such as non-volatile memory 42 of FIG. 4, comprised by the apparatus. The first information repository may be external to the apparatus. The second information repository may be external to the apparatus.

In an example embodiment, an apparatus determines a non-geographic condition. The non-geographic condition may relate to a condition of the apparatus. A non-geographic condition may relate to time, such as a time of day, a date, and/or the like. A non-geographic condition may relate to environment around the apparatus, such as lighting, noise, motion, and/or the like. The apparatus may identify at least part of the first information or at least part of the second information that relates to the non-geographic condition. For example, the apparatus may identify that information associated with hours of operation relates to time of day. The apparatus may determine a relationship between the identified information and the non-geographic condition. For example, the apparatus may determine that a business is open based on the time of day being within hours of operation. The apparatus may provide information indicating the determined relationship.

In an example embodiment, the apparatus may determine at least one operation associated with the first information or the second information. The operation may relate to geographical navigation or may be unrelated to geographical navigation. For example, the operation may relate to providing route information to the significant location. In another example, the operation may relate to retrieving additional information associated with the significant location, such as a document associated with a uniform resource locator. In still another example, the operation may relate to utilizing contact information, for example, sending a message, causing voice communication, and/or the like.

Figure 6A:
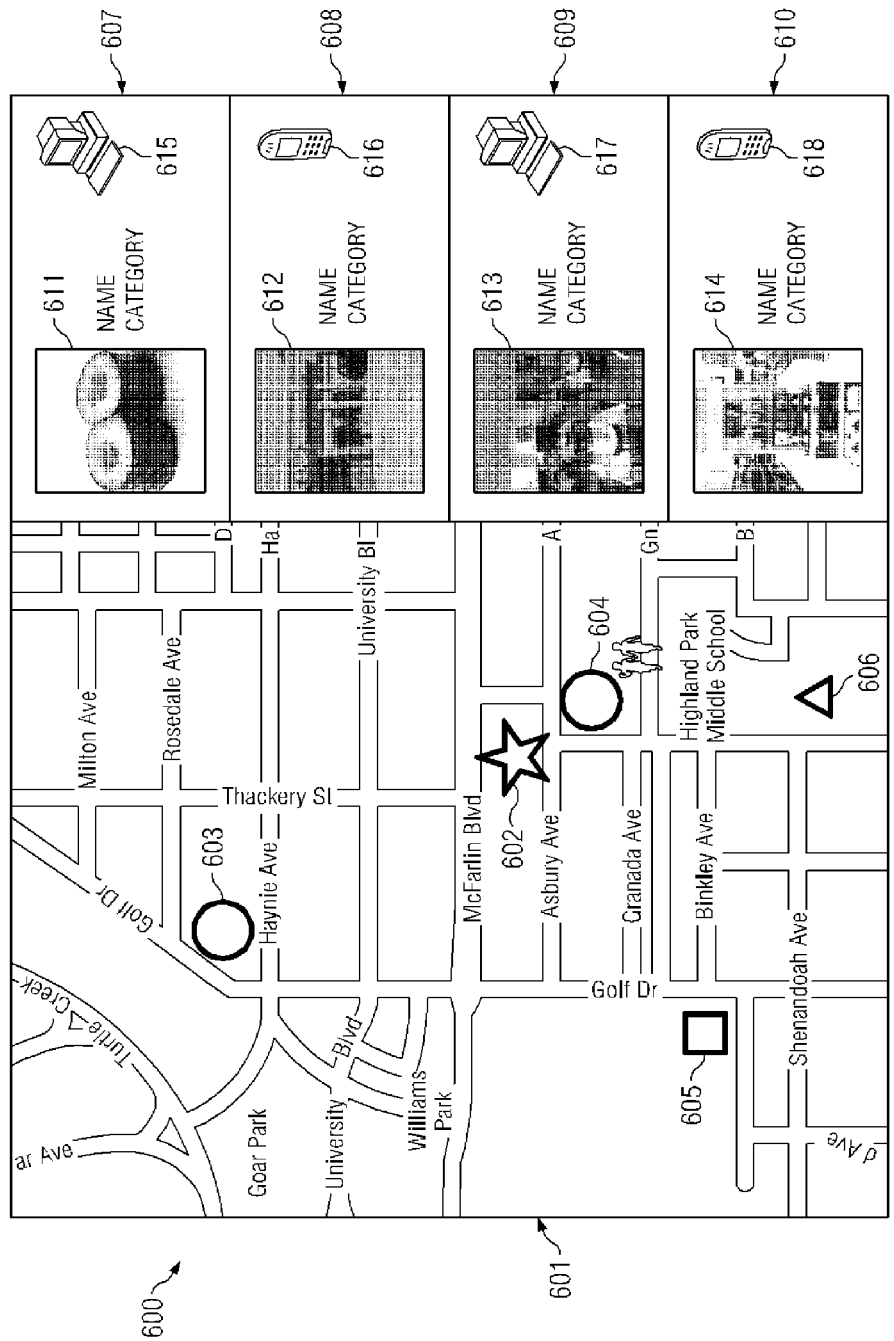
FIGS. 6A-6D are diagrams illustrating graphical representations of information according to at least one example embodiment.

FIG. 6A is a diagram illustrating a graphical representation of information 600 according to at least one example embodiment. The example of FIG. 6A illustrates a graphical representation of information associated with significant location 603, information associated with significant location 604, information associated with significant location 605, and information associated with significant location 606, in relation to representation of geographic position 602, and map information 601. In an example embodiment, representation of geographic position 602 may relate to apparatus geographic location.

In the example of FIG. 6A, representation of information 607 relates to the significant location indicated by graphical representation of information associated with significant location 603. Representation of information 607 may comprise indication of a name and category. The category may relate to a classification, such as a restaurant. Representation of information 607 may comprise an associated image 611. In an example embodiment, an apparatus retrieves historic document information associated with the significant location indicated by graphical representation of information associated with significant location 603. For example, image 611 and category information may be part of the historic document information. The historic document information may comprise information that indicates a historic device that received the information referred to by the historic document information, such as a retrieved document. Representation of information 607 may comprise indication of historic device 615.

In the example of FIG. 6A, representation of information 608 relates to the significant location indicated by graphical representation of information associated with significant location 604. Representation of information 608 may comprise indication of a name and category. The category may relate to a classification, such as landmark, restaurant, automobile service station, store, and/or the like. Representation of information 608 may comprise an associated image 612. In an example embodiment, an apparatus retrieves historic document information associated with the significant location indicated by graphical representation of information associated with significant location 604. For example, image 612 may be part of the historic document information. The historic document information may comprise information that indicates a historic device that received the information referred to by the historic document information, such as a retrieved document. Representation of information 608 may comprise indication of historic device 616.

In the example of FIG. 6A, representation of information 609 relates to the significant location indicated by graphical representation of information associated with significant location 605. Representation of information 609 may comprise indication of a name and category. The category may relate to a classification, such as an automobile service station, store. Representation of information 609 may comprise an associated image 613. In an example embodiment, an apparatus retrieves historic document information associated with the significant location indicated by graphical representation of information associated with significant location 605. For example, category may be part of the historic document information. The historic document information may comprise information that indicates a historic device that received the information referred to by the historic document information, such as a retrieved document. Representation of information 609 may comprise indication of historic device 617.

In the example of FIG. 6A, representation of information 610 relates to the significant location indicated by graphical representation of information associated with significant location 606. Representation of information 610 may comprise indication of a name and category. The category may relate to a classification, such as a store. Representation of information 610 may comprise an associated image 614. In an example embodiment, an apparatus retrieves historic document information associated with the significant location indicated by graphical representation of information associated with significant location 606. For example, category may be part of the historic document information. The historic document information may comprise information that indicates a historic device that received the information referred to by the historic document information, such as a retrieved document. Representation of information 610 may comprise indication of historic device 618.

Figure 6B:
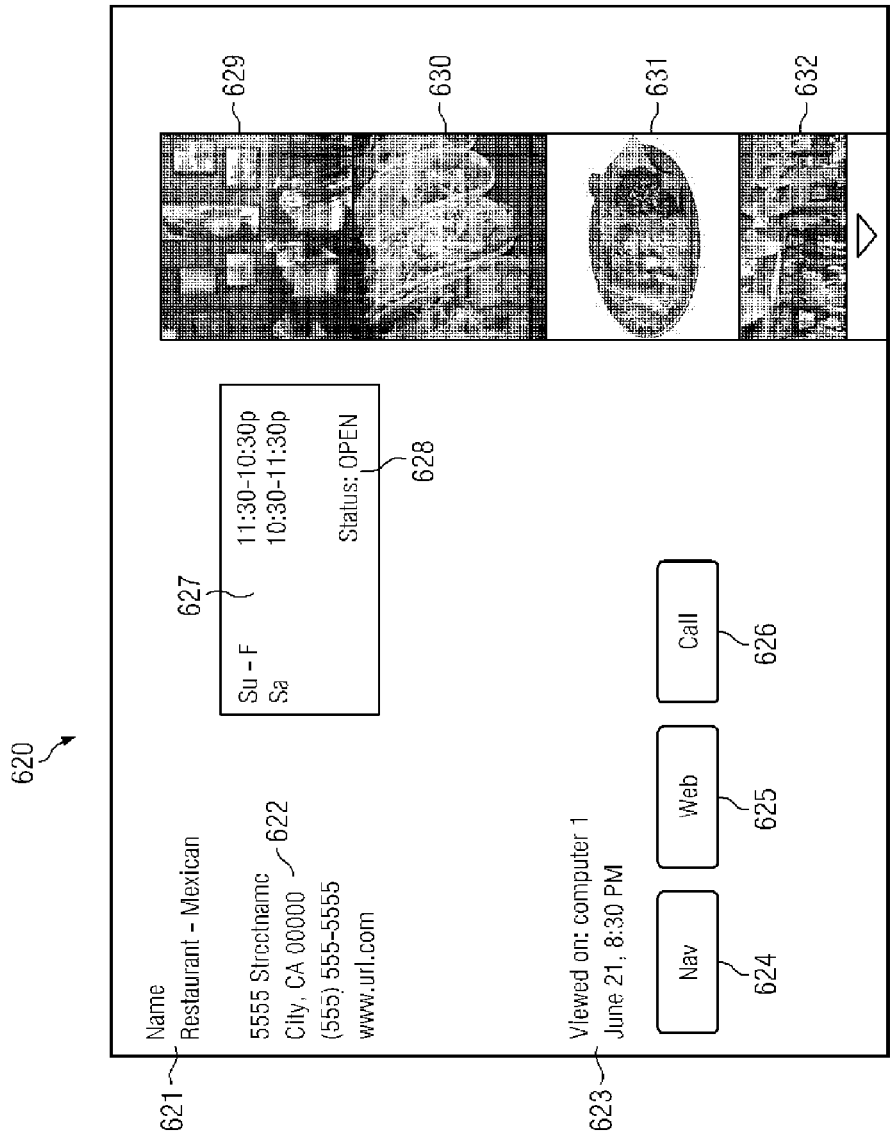

FIG. 6B is a diagram illustrating a graphical representation of information associated with a significant location 620 according to at least one example embodiment. Representation of information 621 indicates name and category of the significant location. Representation of contact information 622 indicates contact information associated with the significant location. The contact information comprises a physical address, a telephone number, and a uniform resource locator. However, in an example embodiment, contact information excludes physical address and uniform resource locator. Representation of information associated with operation 624 indicates a navigation operation. The navigation operation may be based, at least in part, on geographic position of the significant location. Representation of information associated with operation 625 indicates an operation to retrieve additional information associated with the significant location. For example, the operation may utilize the uniform resource locator of the contact information to retrieve at least one document. Representation of information associated with operation 626 indicates an operation to utilize telephone number of the contact information to cause voice communication. Causing voice communication may relate to initiating a telephone call, sending a voice message, and/or the like. Representation of information associated with hours of operation 627 indicates that the restaurant is open. The apparatus may identify that the hours of operation is associated with time of day and determine time of day at the apparatus indicates that the significant location is within its hours of operation. Although, in the example of FIG. 6B, indication that the restaurant is open comprises text information, the indication may comprise, in part or in entirety, graphical information, such as an icon. Graphical representation 620 comprises images 629-632 related to the significant location. In an example embodiment, an apparatus retrieves historic document information associated with the significant location. For example, category, image 629, image 631, image 632, hours of operation, and telephone number may be part of the historic document information. The historic document information may comprise information that indicates a historic device that received the information referred to by the historic document information, such as a retrieved document. Representation of information 623 indicates the historic device and time at which the historic device received the information referred to by the historic document information.

Figure 6C:
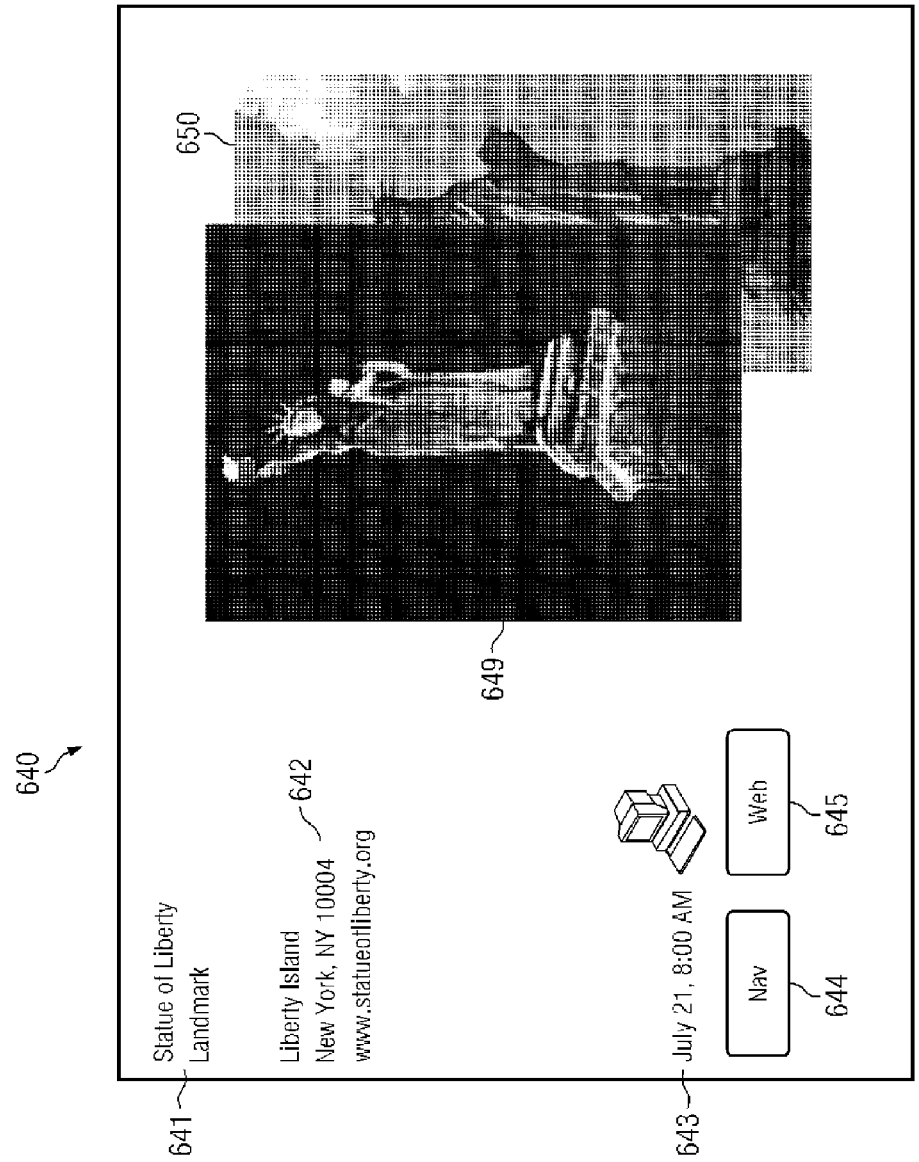

FIG. 6C is a diagram illustrating a graphical representation of information associated with a significant location 640 according to at least one example embodiment. Representation of information 641 indicates name and category of the significant location. Representation of contact information 642 indicates contact information associated with the significant location. The contact information comprises a physical address and a uniform resource locator. Representation of information associated with operation 644 indicates a navigation operation. The navigation operation may be based, at least in part, on geographic position of the significant location. Representation of information associated with operation 645 indicates an operation to retrieve additional information associated with the significant location. For example, the operation may utilize the uniform resource locator of the contact information to retrieve at least one document. Graphical representation 640 comprises image 649 and image 650 related to the significant location. In an example embodiment, the apparatus determines a non-geographical condition associated with low lighting. In such an example, the apparatus may determine to represent image 649, which indicates an nighttime image, more prominently that image 650, which indicates a daytime image. In an example embodiment, an apparatus retrieves historic document information associated with the significant location. For example, category, image 649, and contact information may be part of the historic document information. The historic document information may comprise information that indicates a historic device that received the information referred to by the historic document information, such as a retrieved document. Representation of information 643 indicates the historic device and time at which the historic device received the information referred to by the historic document information.

Figure 6D:
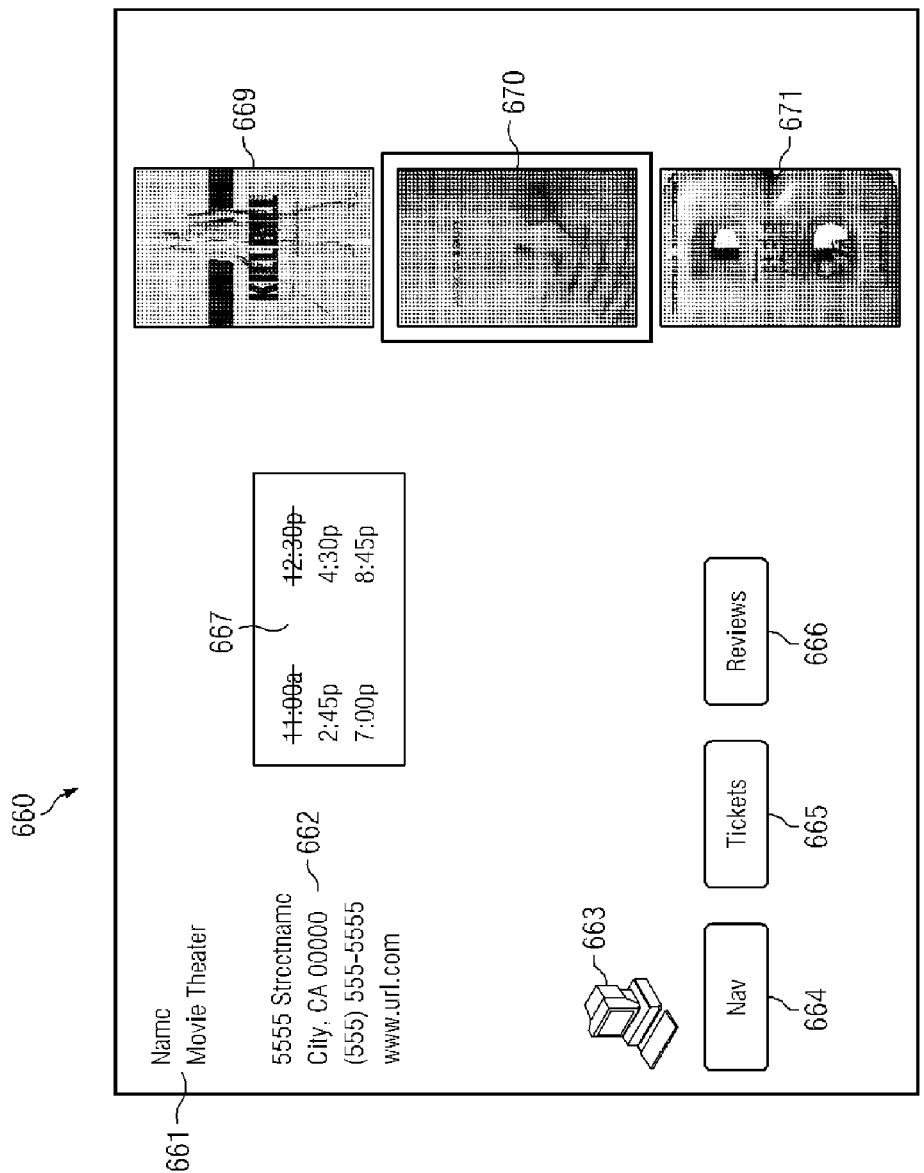

FIG. 6D is a diagram illustrating a graphical representation of information associated with a significant location 660 according to at least one example embodiment. Representation of information 661 indicates name and category of the significant location. Representation of contact information 662 indicates contact information associated with the significant location. The contact information comprises a physical address, a telephone number, and a uniform resource locator. Representation of information associated with operation 664 indicates a navigation operation. The navigation operation may be based, at least in part, on geographic position of the significant location. Representation of information associated with operation 665 indicates an operation to retrieve additional information associated with the significant location. For example, the operation may utilize the uniform resource locator of the contact information to retrieve at least one document. Representation of information associated with operation 666 indicates an operation to represent information associated with a movie review. Graphical representation 660 comprises image 669, image 670, and image 671 related to the significant location, in particular, indicating movies being shown at the movie theater. Representation of information associated with show times 667 indicates that the 11:00 AM and the 12:30 PM show times are not available. The apparatus may identify that the show times are associated with time of day and determine time of day at the apparatus indicates that the 11:00 AM and 12:30 PM show times are not available. Graphical representation 620 comprises images 669-670 related to the significant location. In an example embodiment, an apparatus retrieves historic document information associated with the significant location. For example, category, image 669, image 670, image 671, show times, and contact information may be part of the historic document information. The historic document information may comprise information that indicates a historic device that received the information referred to by the historic document information, such as a retrieved document. Representation of information 663 indicates the historic device and time at which the historic device received the information referred to by the historic document information.

Figure 7:
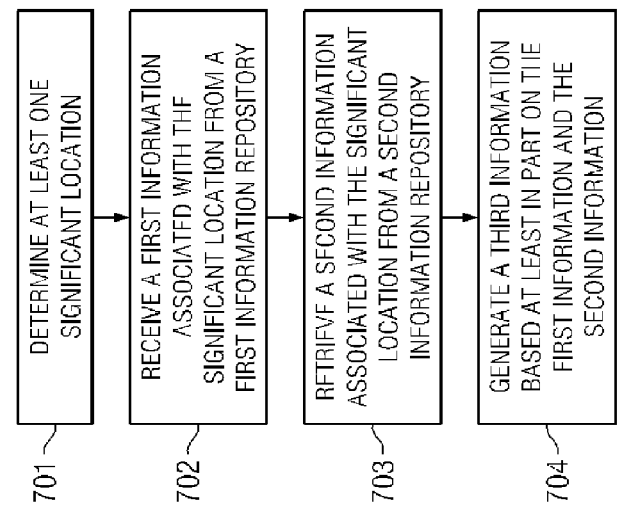
FIG. 7 is a flow diagram showing a set of operations for generating information according to an example embodiment.

FIG. 7 is a flow diagram showing a set of operations 700 for generating information according to an example embodiment. An apparatus, for example electronic device 10 of FIG. 4 or a portion thereof, may utilize the set of operations 700. The apparatus may comprise means, including, for example processor 20 of FIG. 4, for performing the operations of FIG. 7. In an example embodiment, an apparatus, for example device 10 of FIG. 4, is transformed by having memory, for example memory 42 of FIG. 4, comprising computer code configured to, working with a processor, for example processor 20 of FIG. 4, cause the apparatus to perform set of operations 700.

At block 701, the apparatus determines at least one significant location. The significant location may be similar as described with reference to FIGS. 5A-5C.

At block 702, the apparatus receives a first information associated with the significant location from a first information repository, similar as described with reference to FIGS. 6A-6D.

At block 703, the apparatus retrieves a second information associated with the significant location from a second information repository. The retrieving may be based, at least in part, on the first information, similar as described with reference to FIGS. 6A-6D. The retrieving may be performed in response to receiving the first information. The retrieving may be performed absent user interaction.

At block 704, the apparatus generates a third information based at least in part on the first information and the second information. The third information may be displayed, caused to be displayed, stored, sent to a different apparatus, and/or the like.

Figure 8:
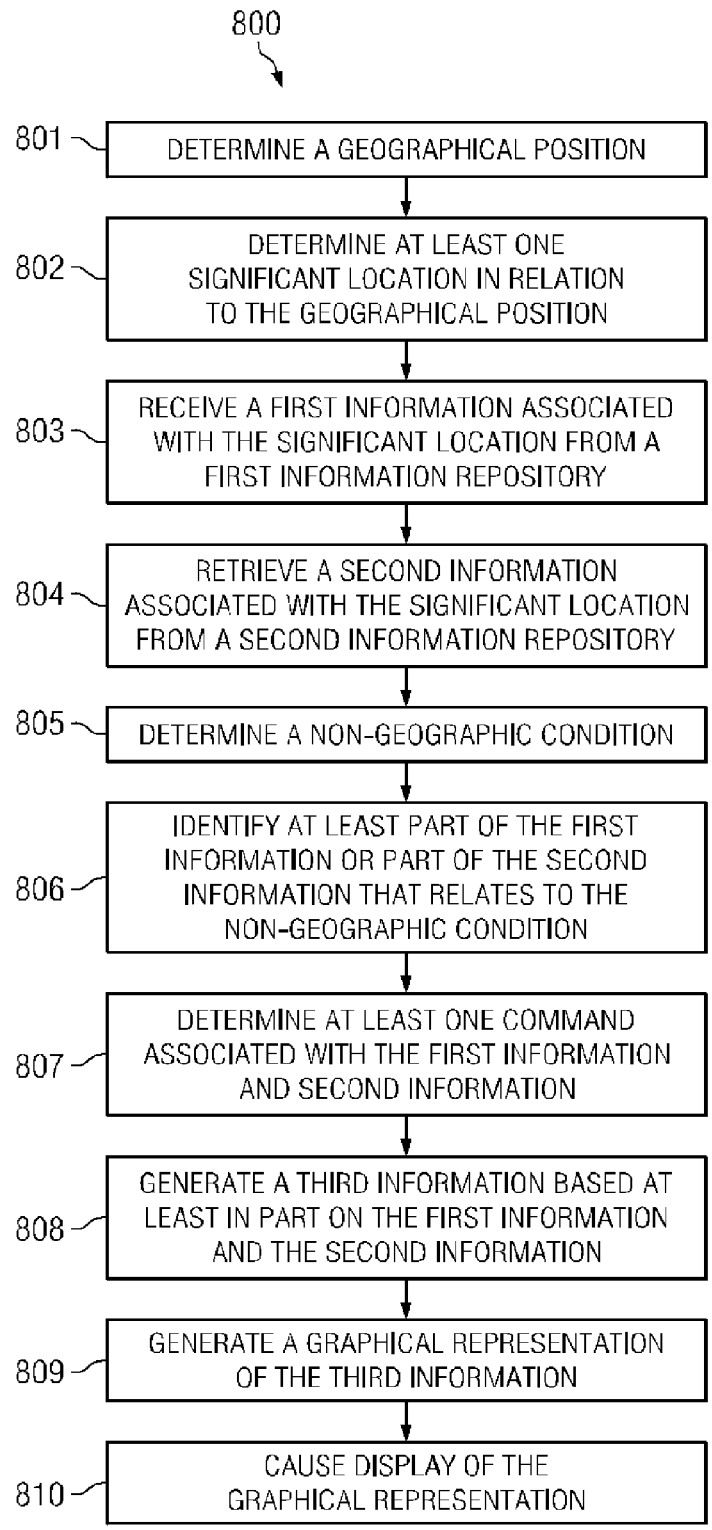
FIG. 8 is a flow diagram showing a set of operations 800 for generating information according to an example embodiment.

FIG. 8 is a flow diagram showing a set of operations 800 for generating information according to an example embodiment. An apparatus, for example electronic device 10 of FIG. 4 or a portion thereof, may utilize the set of operations 800. The apparatus may comprise means, including, for example processor 20 of FIG. 4, for performing the operations of FIG. 8. In an example embodiment, an apparatus, for example device 10 of FIG. 4, is transformed by having memory, for example memory 42 of FIG. 4, comprising computer code configured to, working with a processor, for example processor 20 of FIG. 4, cause the apparatus to perform set of operations 800.

At block 801, the apparatus determines a geographical position, similar as described with reference to FIGS. 5A-5C.

At block 802, the apparatus determines at least one significant location in relation to the geographic position, similar as described with reference to FIGS. 5A-5C.

At block 803, the apparatus receives a first information associated with the significant location from a first information repository, similar as described with reference to block 701 of FIG. 7.

At block 804, the apparatus retrieves a second information associated with the significant location from a second information repository, similar as described with reference to block 703 of FIG. 7.

At block 805, the apparatus determines a non-geographic condition, similar as described with reference to FIGS. 6A-6D.

At block 806, the apparatus identifies at least part of the first information of part of the second information that relates to the non-geographic condition, similar as described with reference to FIGS. 6A-6D.

At block 807, the apparatus determines at least one operation associated with the first information or the second information, similar as described with reference to FIGS. 6A-6D.

At block 808, the apparatus generates a third information based at least in part on the first information the second information, the determined operation, the identified information, and the non-geographic condition.

At block 809, the apparatus generates a graphical representation of the third information, similar as described with reference to FIGS. 6A-6D.

At block 810, the apparatus causes display of the graphical representation. Causing of display may relate to sending information comprising the at least part of the focus message to a display, such as display 28 of FIG. 4, sending information to an external apparatus, such as an external display, and/or the like.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 4. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. For example, block 303 of FIG. 3 may be performed after block 304. Furthermore, if desired, one or more of the above-described functions may be optional or may be combined. For example, blocks 303 and 307 of FIG. 3 may be optional and/or combined with block 306.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus for aggregating information from a first device and a second device, comprising:
   a processor;
   memory including computer program code, the memory and the computer program code configured to, working with the processor, cause the apparatus to perform at least the following:
   determine at least one significant location;
   receive a first information identified from at least a portion of a first document associated with the significant location from the first device;
   store the first information in association with the significant location;
   in response to receiving the first information, access a second information identified from at least a portion of a second document associated with the significant location, wherein the second information is provided by the second device, the second device identified based on a user account associated with the first device; and
   generate a third information by aggregating the first information and the second information such that the third information is viewable on one interface.

2. The apparatus of claim 1, wherein the memory and computer program code are further configured to, working with the processor, cause the apparatus to perform at least generating a graphical representation of the third information.

3. The apparatus of claim 2, wherein the graphical representation comprises a representation of geographic position of the significant location.

4. The apparatus of claim 2, wherein the graphical representation comprises map information.

5. The apparatus of claim 2, wherein the memory and computer program code are further configured to, working with the processor, cause the apparatus to perform at least causing display of the graphical representation.

6. The apparatus of claim 1, wherein the first information repository relates to a geographical information repository.

7. The apparatus of claim 1, wherein the second information repository is external to the apparatus.

8. The apparatus of claim 1, wherein the memory and computer program code are further configured to, working with the processor, cause the apparatus to perform at least determining a non-geographic condition, wherein the third information is based at least in part on the non-geographic condition.

9. The apparatus of claim 8, wherein the non-geographic condition is related to time.

10. The apparatus of claim 1, wherein the memory and computer program code are further configured to, working with the processor, cause the apparatus to perform at least
    determining at least one operation associated with the first information or the second information, wherein the third information comprises information associated with the operation.

11. The apparatus of claim 10, wherein the third information comprises contact information and the operation relates to utilization of the contact information.

12. The apparatus of claim 10, wherein the operation relates to retrieving additional information associated with the significant location.

13. The apparatus of claim 1, wherein the first information comprises a name associated with the significant location.

14. The apparatus of claim 1, wherein the second information comprises a search result based on a search performed with the second device.

15. The apparatus of claim 1, wherein the second information is cached on the apparatus.

16. The apparatus of claim 1, wherein the second information is retrieved from the second device in response to the apparatus receiving the first information.

17. The apparatus of claim 1, wherein the at least one significant location is determined based on the first information.

18. A method for aggregating information from a first device and a second device, comprising:
    determining at least one significant location;
    receiving a first information identified from at least a portion of a first document associated with the significant location from the first device;
    storing the first information in association with the significant location;
    in response to receiving the first information, accessing a second information identified from at least a portion of a second document associated with the significant location, wherein the second information is provided by the second device, the second device identified based on a user account associated with the first device; and
    generating, using a processor, a third information by aggregating the first information and the second information such that the third information is viewable on one interface.

19. A computer program product for aggregating information from a first device and a second device, comprising a non-transitory computer-readable medium storing program code instructions, the program code instructions being configured to, upon execution, cause an apparatus to at least perform:
    determining at least one significant location;
    receiving a first information identified from at least a portion of a first document associated with the significant location from the first device;
    store the first information in association with the significant location;
    in response to receiving the first information, accessing a second information identified from at least a portion of second document associated with the significant location, wherein the second information is provided by the second device, the second device identified based on a user account associated with the first device; and generating a third information by aggregating the first information and the second information such that the third information viewable on one interface.

* * * * *

UNITED STATES PATENT AND TRADEMARK OFFICE
CERTIFICATE OF CORRECTION

PATENT NO. : 9,170,123 B2  
APPLICATION NO. : 12/982597  
DATED : October 27, 2015  
INVENTOR(S) : Horii et al.

Page 1 of 1

It is certified that error appears in the above-identified patent and that said Letters Patent is hereby corrected as shown below:

In the claims:

Column 22,
Lines 66 and 67, Claim 19, "portion of second document" should read --portion of a second document--.

Column 23,
Line 6, Claim 19, "information viewable" should read --information is viewable--.

Signed and Sealed this
Twelfth Day of April, 2016

Michelle K. Lee
*Director of the United States Patent and Trademark Office*